United States Patent
Yanada et al.

(10) Patent No.: US 8,368,777 B2
(45) Date of Patent: Feb. 5, 2013

(54) IMAGING APPARATUS FOR PERFORMING SIGNAL PROCESSES ADAPTED TO OPERATIONAL MODES

(75) Inventors: Takashi Yanada, Hachioji (JP); Akira Ueno, Hachioji (JP); Yoshinobu Tanaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 352 days.

(21) Appl. No.: 12/769,453

(22) Filed: Apr. 28, 2010

(65) Prior Publication Data

US 2010/0309319 A1    Dec. 9, 2010

(30) Foreign Application Priority Data

May 6, 2009    (JP) ................................. 2009-136396

(51) Int. Cl.
*H04N 5/76* (2006.01)
*H04N 5/228* (2006.01)

(52) U.S. Cl. ................................. 348/231.99; 348/222.1
(58) Field of Classification Search .................. None
See application file for complete search history.

(56) References Cited

U.S. PATENT DOCUMENTS

2005/0024369 A1* 2/2005 Xie .............................. 345/547
2005/0168591 A1* 8/2005 Proidl ......................... 348/222.1

FOREIGN PATENT DOCUMENTS

EP        2053847        * 4/2009
JP        2008-283331      11/2008

* cited by examiner

*Primary Examiner* — Albert Cutler
(74) *Attorney, Agent, or Firm* — John C. Pokotylo; Straub & Pokotylo (57) ABSTRACT

An imaging apparatus includes an imaging element, a transfer unit, a storage unit, a signal processing unit, a write control unit, a read control unit, and a clock generation unit. The imaging element outputs image signals. The transfer unit serially transfers the image signals by using transfer channels. The storage unit stores the image signals transferred. The signal processing unit processes the image signals stored. The write control unit controls the writing of the image signals to the storage unit, in synchronism with a first clock signal synchronous with the image signals. The read control unit controls the reading of the image signals from the storage unit, in synchronism with a second clock signal for driving the signal processing unit. The clock generation unit generates the second clock signal having a frequency that accords with an amount of data constituted by the image signals transferred.

14 Claims, 9 Drawing Sheets

|      | ch1     | ch2      | ch3     | ch4      |
|------|---------|----------|---------|----------|
|      | R1 [7:0]| GR1 [7:0]| R2 [7:0]| GR2 [7:0]|

FIG. 4A

|      | ch1      | ch2       | ch3      | ch4       |
|------|----------|-----------|----------|-----------|
|      | R1 [15:0]| GR1 [15:0]| R2 [15:0]| GR2 [15:0]|

IMAGING APPARATUS FOR PERFORMING SIGNAL PROCESSES ADAPTED TO OPERATIONAL MODES

CROSS-REFERENCE TO RELATED APPLICATIONS

This application is based upon and claims the benefit of priority from prior Japanese Patent Application No. 2009-136396, filed Jun. 5, 2009, the entire contents of which are incorporated herein by reference.

BACKGROUND OF THE INVENTION

1. Field of the Invention

The present invention relates to an imaging apparatus that can achieve serial transfer of image signals produced by an imaging element by using a number of transfer channels, the number according with an operating mode.

2. Description of the Related Art

In recent years, the imaging apparatus can photograph more and more images in series, thanks to the increasing operating speed of the imaging element the imaging apparatus has. Along with this trend, the pixel rate of the image signals output from the imaging elements is increasing. Therefore, the image signals must be processed at high speed.

A technique is known, which may be used to cope with the increased pixel rate of image signals. This technique uses a low-voltage differential signaling (LVDS) system to accomplish serial transfer of image signals output from an imaging element. If the image signals are transferred by means of the LVDS system, the signals can be transferred at high speed and the energy required for their transfer can be reduced.

Imaging apparatuses developed in recent years incorporate imaging elements having a plurality of output channels. The image signals produced by such an imaging element can be output through these output channels concurrently. Further, an imaging apparatus has been proposed in which the number of channels used to output the image signals and the bit length of the image signals to transfer can be set in accordance with the operating mode of the imaging apparatus.

For example, in the imaging apparatus proposed in Jpn. Pat. Appln. KOKAI Publication No. 2008-283331, the sensor part (imaging element) provided in the imaging unit selects W operating channels in accordance with the operating mode. From each channel selected, an image signal having bit length n is output. These image signals are converted to differential serial image signals in the data transmission unit. The image signals, thus converted to serial signals, are supplied by means of serial transfer, through the W signal lines to the data reception unit provided in the image processing unit. A high-speed clock signal synchronous with the serial signals is output to the PLL incorporated in the image processing unit.

In the data reception unit, the serial signals corresponding to the operating channels, respectively, are converted to parallel signals having bit width M. The sync code embedded in each parallel signal is detected in the data restoration unit. From the sync code, a data window is extracted. From the data window, an image signal having bit length n is restored. The image signal restored is output to the signal processing unit. In the PLL, operating clock signals for use in the data reception unit, data restoration unit and clock gating circuit, respectively, are generated from the clock signal input as differential signals from the imaging unit.

The clock signal is output from the clock gating circuit to the signal processing circuit, only in a period in which the image signal restored in the data restoration unit remains valid. In the signal processing unit, the image signal is processed, only in a period in which the image signal, for which a clock signal is input from the clock gating circuit, remains valid. Signal processing is thus performed in the signal processing unit, in synchronism with the image signal.

Assume that the number of output channels that the imaging element has and the bit length of the image signal can be changed in accordance with the operating mode of the imaging apparatus. Then, the amount of data input, as image signal, from the imaging element changes in accordance with the operating mode. In this case, the clock signal to be synchronized with the image signals serially transferred must be changed, also in accordance with the operating mode. In the imaging apparatus of Jpn. Pat. Appln. KOKAI Publication No. 2008-283331, the high-speed clock signal input from the data transmission unit is converted to a clock signal of such a frequency band that the image processing unit can process it. This clock signal is used as operating clock signal, driving the clock gating circuit so that the signal processing unit may process signals in the imaging apparatus of Jpn. Pat. Appln. KOKAI Publication No. 2008-283331.

BRIEF SUMMARY OF THE INVENTION

According to an aspect of this invention, there is provided an imaging apparatus comprising: an imaging element configured to output image signals; a transfer unit configured to serially transfer the image signals, by using a plurality of transfer channels; a storage unit configured to store the image signals serially transferred from the plurality of transfer channels; a signal processing unit configured to process the image signals stored in the storage unit; a write control unit configured to control writing of the image signals from the transfer unit to the storage unit, in synchronism with a first clock signal synchronous with the image signals serially transferred by the transfer unit; a read control unit configured to control reading of the image signals from the storage unit to the signal processing unit, in synchronism with a second clock signal for driving the signal processing unit; and a clock generation unit configured to generate the second clock signal having a frequency that accords with an amount of data constituted by the image signals transferred from the transfer unit to the storage unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of this invention will be described, with reference to the accompanying drawings.

[First Embodiment]

Figure 1:
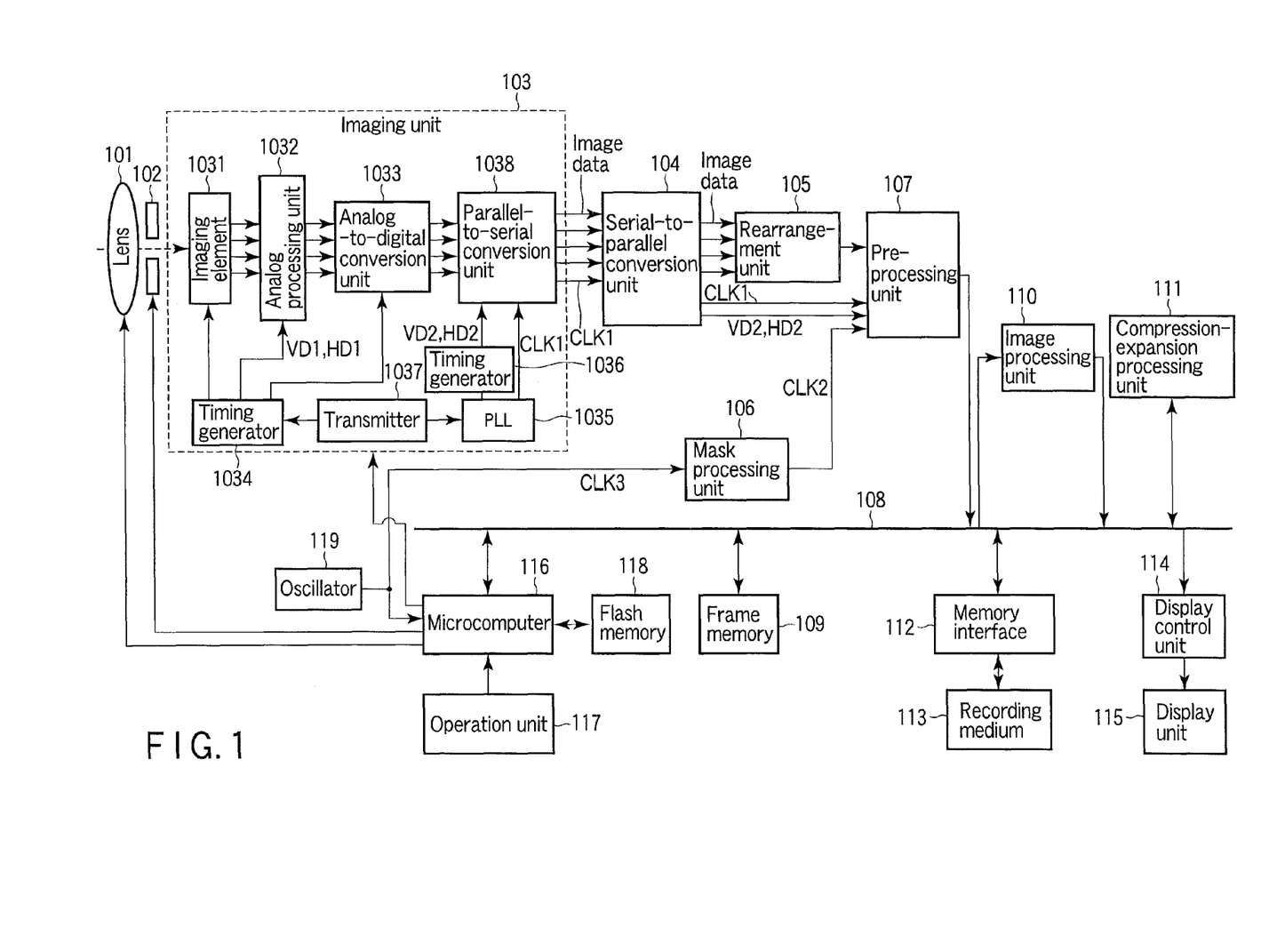
FIG. 1 is a diagram showing an exemplary configuration of an imaging apparatus according to a first embodiment of this invention.

A first embodiment of this invention will be described first. FIG. 1 is a diagram that shows an exemplary configuration of an imaging apparatus according to a first embodiment of this invention. The imaging apparatus according to this embodiment has a plurality of operating modes. The operating modes include, for example, single-shot mode, multi-shot mode, movie mode, live-view mode, and AF mode.

Single-shot mode is an operating mode for taking still photographs. Multi-shot mode is an operating mode for taking a sequence of still photographs. Movie mode is an operating mode for shooting a moving picture. Live-view mode is an operating mode in which the imaging element of the imaging apparatus is continuously operated to allow a real-time moving picture to be displayed. AF [auto-focus] mode is an operating mode in which the imaging element is continuously operated and the contrast of the images obtained is evaluated to accomplish automatic focusing of the lens of the imaging apparatus.

As shown in FIG. 1, the imaging apparatus has a lens 101, a shutter diaphragm 102, an imaging unit 103, a serial-to-parallel conversion unit 104, a rearrangement unit 105, a mask processing unit 106, a pre-processing unit 107, a bus 108, a frame memory 109, an image processing unit 110, a compression-expansion processing unit 111, a memory interface 112, a recording medium 113, a display control unit 114, a display unit 115, a microcomputer 116, an operation unit 117, a flash memory 118, and an oscillator 119.

The lens 101 focuses the optical image of an object at the imaging element 1031 that is incorporated in the imaging unit 103. The lens 101 is configured to be driven along its optical axis under control of the microcomputer 116. As the lens 101 is so driven, the focal point of the lens 101 is adjusted.

The shutter diaphragm 102 is provided in the vicinity of the lens 101. The shutter diaphragm 102 is a diaphragm that works also as shutter and adjusts the amount of light incident from the lens 101 on the imaging element 1031 (i.e., exposure of the imaging element 1031), under the control of the microcomputer 16. A shutter and a diaphragm, which operate independently, may of course be used in place of the shutter diaphragm 102.

The imaging unit 103 has an imaging element 1031, an analog processing unit 1032, an analog-to-digital conversion unit 1033, a timing generator 1034, a PLL 1035, a timing generator 1036, a transmitter 1037, and a parallel-to-serial conversion unit 1038.

Figure 2A:
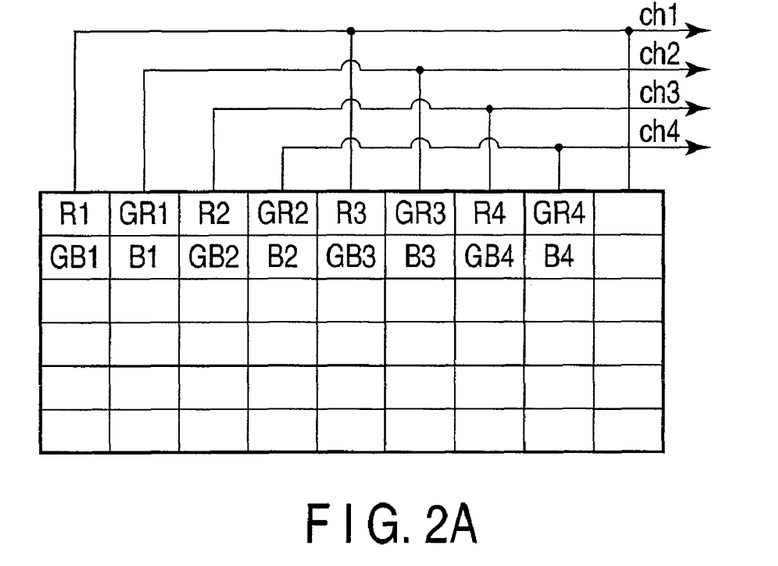
FIG. 2A is a diagram showing an exemplary configuration of an imaging element.

The imaging element 1031 has a light receiving surface, on which pixels and color filters are arranged. The pixels are photoelectric conversion elements such as photodiodes. The color filters are bonded to the pixels, respectively, defining such a Bayer arrangement as shown in FIG. 2A. The imaging element 1031 is connected, at its light receiving surface, to a plurality of output channels (four channels ch1 to ch4 in the case of FIG. 2A). So configured as shown in FIG. 2A, the imaging element 1031 converts the light focused by the lens 101 into an electrical signal (image signal) by photoelectric conversion, outputting this image signal in accordance with a vertical sync signal VD1 and a horizontal sync signal HD1 input from timing generator 1034.

Figure 2B:
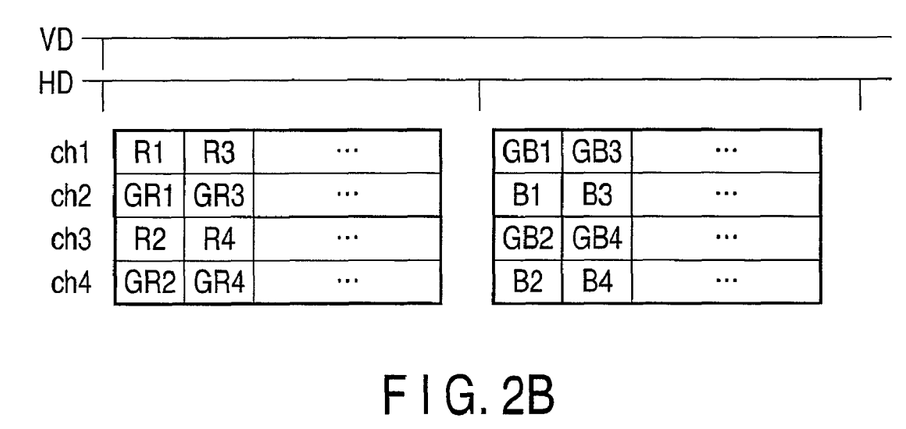
FIG. 2B is a timing chart explaining how an image signal is read by using four output channels the imaging element has.

In this embodiment, the imaging element 1031 can read image signals from a plurality of pixels concurrently by using a plurality of output channels. In the configuration of FIG. 2A, for example, image signals may be read by using all output channels available, i.e., four channels ch1 to ch4, as illustrated in the timing chart of FIG. 2B.

In this embodiment, the imaging element 1031 can also change the number of channels for use in outputting image signals, in accordance with the operating mode. In multi-shot mode, for example, wherein high-quality images are required and signals must be processed at high speed, the number of output channels for outputting image signals can be increased, thereby to output signals at high speed. In single-shot mode, wherein signals need not be processed as fast as in multi-shot mode, the number of output channels for outputting image signals can be decreased, thereby reducing energy consumption.

The analog processing unit 1032 performs various analog processes on the image signals output from the respective output channels of the imaging element 1031, in synchronism with vertical sync signal VD1 and horizontal sync signal HD1 output from timing generator 1034. The analog processes include an automatic gain control (AGC). AGC is a process of adjusting the amplitudes of the image signals output from the respective output channels of the imaging element 1031, to the dynamic range of the analog-to-digital conversion unit 1033.

The analog-to-digital conversion unit 1033 converts the digital image signals (hereinafter referred to as image data items) output from the analog processing unit 1032 in association with the respective output channels of the imaging element 1031, in synchronism with vertical sync signal VD1 and horizontal sync signal HD1 output from timing generator 1034. Then, the analog-to-digital conversion unit 1033 outputs the image data items obtained in association with the output channels, respectively, as parallel data, to the parallel-to-serial conversion unit 1038. In this embodiment, the analog-to-digital conversion unit 1033 can change the bit length of the image data acquired by analog-to-digital conversion, i.e., number of quantization bits produced by subjecting the image data to analog-to-digital conversion. Thus, if high-quality images are required as in, for example, single- or multi-shot mode, the bit length of the image data can be increased to increase the amount of data. If the images need not have high quality as in movie, live-view or AF mode, the bit length of the image data can be decreased to process signals at high speed.

Timing generator 1034 generates a vertical sync signal VD1 and a horizontal sync signal HD1, both synchronous with the reference clock signal input from the transmitter 1037. Timing generator 1034 then inputs vertical sync signal VD1 and horizontal sync signal HD1 thus generated to the imaging element 1031, the analog processing unit 1032 and the analog-to-digital conversion unit 1033.

The phase-locked loop (PLL) 1035 generates an image-signal transfer clock signal (first clock signal) CKL1, which is at a higher speed than the reference clock signal, from the reference clock signal input from the transmitter 1037. The PLL 1035 then inputs clock signal CLK1 to timing generator 1036 and the parallel-to-serial conversion unit 1038.

Timing generator 1036 generates a vertical sync signal VD2 and a horizontal sync signal HD2, both synchronous with the reference clock signal CLK1 input from the PLL 1035. Timing generator 1036 then inputs vertical sync signal VD2 and horizontal sync signal HD2, thus generated, to the parallel-to-serial conversion unit 1038.

The transmitter 1037 inputs the reference clock signal to timing generator 1034 and the PLL 1035. In timing generator 1034, the reference clock signal CLK1 is used to generate the sync signals. In the PLL 1035, the reference clock signal is used to generate clock signal CLK1.

The parallel-to-serial conversion unit 1038 has a plurality of transfer channels associated with the respective output channels of the imaging element 1031. The parallel-to-serial conversion unit 1038 produces serial data (LVDS data) of differential type from the image data output from the analog-to-digital conversion unit 1033 associated with the output channels of the imaging element 1031, and from vertical sync signal VD2 and horizontal sync signal. HD2, in units of data items for the respective output channels of the imaging element 1031. Then, the parallel-to-serial conversion unit 1038 performs serial transfer of the LVDS data, produced in units of data items for the respective output channels of the imaging element 1031, to the serial-to-parallel conversion unit 104 in synchronism with clock signal CLK1. The LVDS data produced in the parallel-to-serial conversion unit 1038 constitutes a serial data item of differential type, in which codes representing the sync signals (vertical and horizontal) are superimposed at the head of a prescribed amount (e.g., one line) of image data.

Figure 3A:
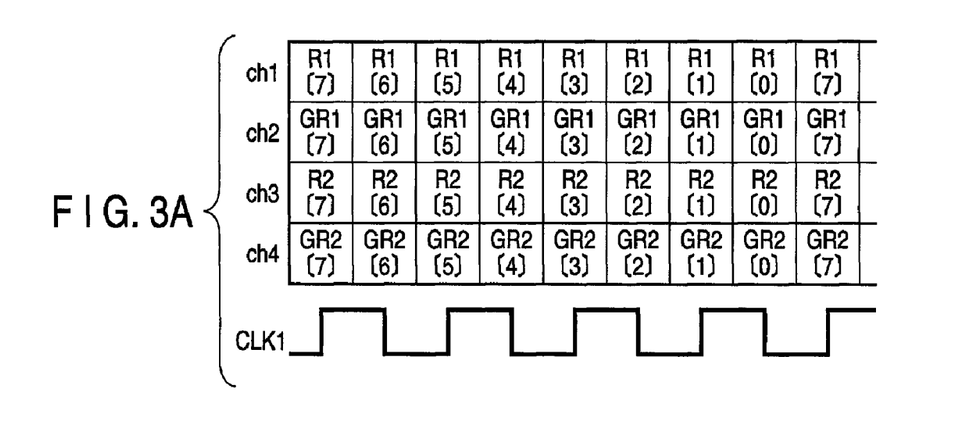
FIGS. 3A and 3B are diagrams explaining an exemplary transfer of image data, which is performed by a parallel-serial conversion unit.
Figure 3B:
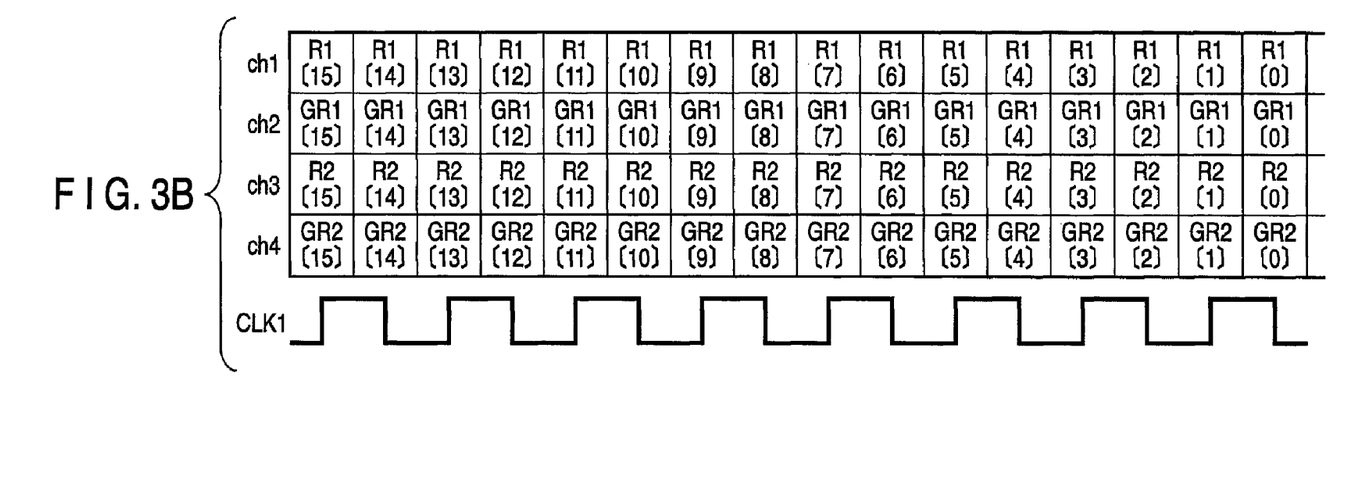

In the LVDS system, two bits of data can be serial-transferred at a time, respectively in synchronism with the rising and falling edges of the clock signal. Hence, to transfer data having an 8-bit length (in movie mode, for example) by using four channels, image data items, each for one pixel, can be transferred from the respective transfer channels of the parallel-to-serial conversion unit 1038, over four cycles (i.e., four clocks) of clock signal CLK1 as illustrated in FIG. 3A. In order to transfer data having a 16-bit length (in single-shot mode, for example) by using four channels, image data items, each for one pixel, can be transferred from the respective transfer channels, over eight cycles (i.e., eight clocks) of clock signal CLK1 as shown in FIG. 3B.

The serial-to-parallel conversion unit 104 converts the LVDS data serial-transferred from the parallel-to-serial conversion unit 1038 by using, for example, the LVDS system, to parallel data. Thus, the serial-to-parallel conversion unit 104 restores the image data, vertical sync signal VD2 and horizontal sync signal HD2.

Figure 4A:
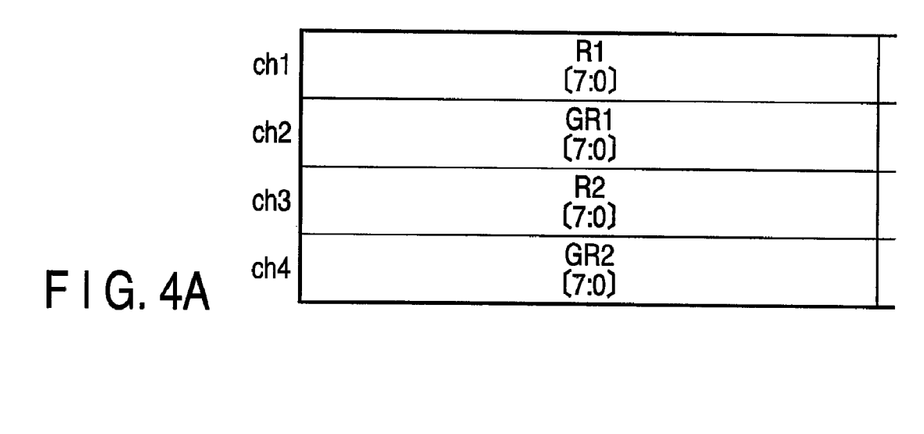
FIGS. 4A and 4B are diagrams explaining an exemplary serial-to-parallel conversion of image data, which is performed by a serial-to-parallel conversion unit.

FIG. 4A shows the image data acquired by subjecting image data having 8-bit length to parallel conversion. In the instance of FIG. 3A, image data for one pixel (8 bits) is serially transferred to the parallel-to-serial conversion unit 1038 in synchronism with four cycles of clock signal CLK1. The serial-to-parallel conversion unit 104 therefore outputs 8 bits of parallel image data, in each period that corresponds to four cycles of clock signal CLK1.

Figure 4B:
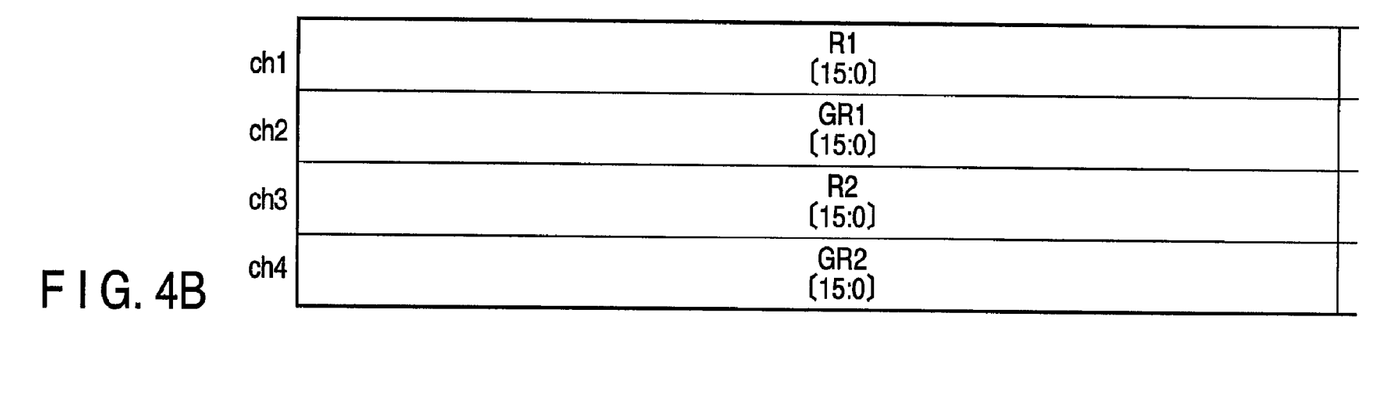

FIG. 4B shows the image data acquired by subjecting image data having 16-bit length to parallel conversion. In the instance of FIG. 3B, image data for one pixel (16 bits) is transferred to the parallel-to-serial conversion unit 1038 in synchronism with eight cycles of clock signal CLK1. The serial-to-parallel conversion unit 104 therefore outputs 16 bits of parallel image data, in each period that corresponds to eight cycles of clock signal CLK1.

The rearrangement unit 105 rearranges the parallel image data output from the serial-to-parallel conversion unit 104 so that the image data may be processed in the pre-processing unit 107. This process of rearranging image data includes a step of rearranging the image data, changing the same to image data for a number of channels, which corresponds to the number of input channels of the pre-processing unit 107, and a step of rearranging the colors in the order corresponding to the Bayer arrangement. In the present embodiment, the image data is so rearranged that it may become synchronous with one edge (for example, the rising edge) of clock signal CLK1 or of a clock signal obtained by frequency-dividing clock signal CLK1.

Figure 5A:
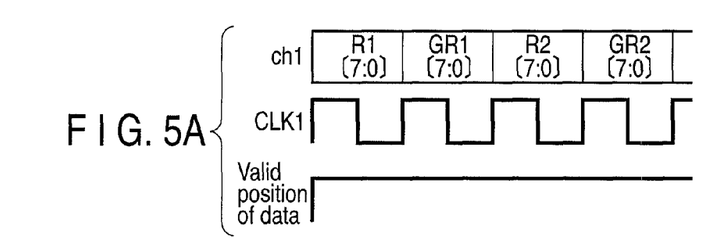
FIGS. 5A, 5B, 5C and 5D are diagrams, each explaining an exemplary data rearrangement process that a rearrangement unit may perform.

FIG. 5A explains an exemplary method of rearranging the four-channel parallel image data shown in FIG. 4A, changing the same to one-channel parallel image data synchronous with clock signal CLK1. As described above, the image data input to the rearrangement unit 105 is rearranged in the order of R1, GR1, R2, GR2, . . . so that the parallel image data may be input to the pre-processing unit 107, in the order of the Bayer arrangement. In the instance of FIG. 4A, image data is input from the serial-to-parallel conversion unit 104 to the rearrangement unit 105, in each period that corresponds to four cycles of clock signal CLK1. The image data for four pixels, thus rearranged, should therefore be output from the rearrangement unit 105 within the time that corresponds to four cycles of clock signal CLK1. Hence, the image data that corresponds to a valid position four times during the four cycles of clock signal CLK1 is output from the rearrangement unit 105.

Figure 5B:
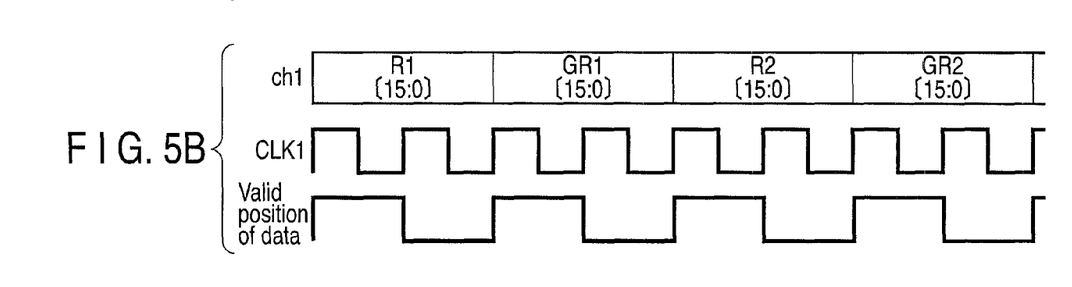

FIG. 5B explains an exemplary serial-to-parallel conversion in which the four-channel parallel image data shown in FIG. 4B is rearranged so that it may change to one-channel parallel image data synchronous with clock signal CLK1. In the instance of FIG. 4B, image data is input from the serial-to-parallel conversion unit 104 to the rearrangement unit 105, in each period that corresponds to eight cycles of clock signal CLK1. The image data for four pixels, thus rearranged, should therefore be output from the rearrangement unit 105 within the time that corresponds to eight cycles of clock signal CLK1. Hence, the rearrangement unit 105 outputs the image data that corresponds to a valid position four times during the eight cycles of clock signal CLK1.

Figure 5C:
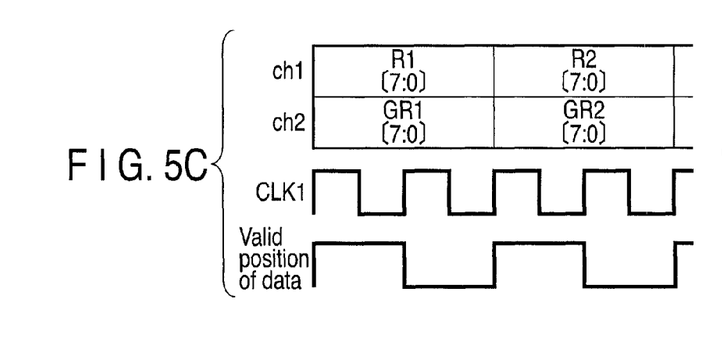

Either instance described above presents a method of rearranging or changing image data to one-channel parallel image data. The number of channels for the data so rearranged can be changed, if necessary, in accordance with the specification and the like of the pre-processing unit 107. For example, FIG. 5C shows the case where the four-channel parallel image data shown in FIG. 4A is rearranged so that it may change to two-channel parallel image data synchronous with clock signal CLK1. In this case, the image data is output in the order of R1, R2, . . . from channel 1 (ch1) of the rearrangement unit 105, and in the order of GR1, GR2, . . . from channel 2 (ch2) of the rearrangement unit 105, so that the image data may be input to the pre-processing unit 107 in the order of the Bayer arrangement. The image data can thus be output from two channels concurrently. It therefore suffices to output two-pixel image data from each channel of the rearrangement unit 105 within half the time required before the data arrangement, or within the time corresponding to the four cycles of clock signal CLK1. Thus, the rearrangement unit 105 outputs image data that corresponds to a valid position two times during the four cycles of clock signal CLK1.

Figure 5D:
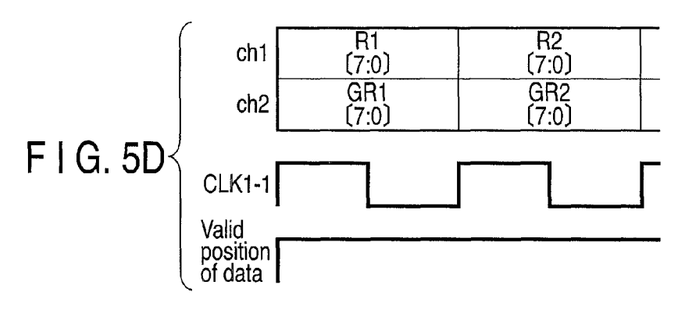

Moreover, FIG. 5D explains an exemplary serial-to-parallel conversion in which parallel image data rearranged so that it may change to image data that is synchronous with a clock signal CLK1-1 obtained by frequency-dividing clock signal CLK1. More precisely, FIG. 5D illustrates the case where four-channel parallel image data is rearranged, becoming parallel image data that is synchronous with clock signal CLK1-1 obtained by dividing the frequency of clock signal CLK1 by two. In this case, the rearrangement unit 105 outputs image data that corresponds to a valid position two times during the two cycles of clock signal CLK1-1.

As described above, the image data output for each channel, from the rearrangement unit 105, changes in amount in accordance with the number of output channels used to output image signals, the bit length of the image data and the number of channels for the data rearranged. As the image data changes in amount, the timing of outputting the image data that corresponds to a valid position changes. In this embodiment, a clock signal is input to the pre-processing unit 107 so that the signal may be processed in the pre-processing unit 107 at the speed corresponding to the timing of outputting such valid image data.

The mask processing unit 106 that has the function of a clock generator masks clock signal (third clock signal) CLK3 input from the oscillator 119, by using a specific pattern. As a result, the mask processing unit 106 generates a clock signal (second clock signal) CLK2 which is synchronous with the third clock signal CLK3 and which has a prescribed frequency. Clock signal CLK2 is a clock signal that accords with the valid position in the image data rearranged in the rearrangement unit 105. A method of generating clock signal CLK2 will be described in detail later.

The pre-processing unit 107, which has the function of a signal processing unit, performs various digital pre-processes, such as shading correction and noise reduction, on the image data rearranged in the rearrangement unit 105, in synchronism with clock signal CLK2. The pre-processing unit 107 then transfers the image data, thus pre-processed, to the frame memory 109 through the bus 108.

The bus 108 is a transfer path through which to transfer various types of data produced in the imaging apparatus to each component incorporated in imaging apparatus. The bus 108 is connected to the pre-processing unit 107, frame memory 109, image processing unit 110, compression-expansion processing unit 111, memory interface 112, display control unit 114 and microcomputer 116. The frame memory 109 stores various types of data, such as the image data processed in the pre-processing unit 107, the image data processed in the image processing unit 110 and the data processed in the compression-expansion processing unit 111.

The image processing unit 110 has various image processing circuits, such as a YC processing circuit, white balance correction circuit and gradation conversion circuit. The YC processing circuit is a circuit configured to converts image data of the Bayer arrangement to luminance-color difference (YC) data. The white balance correction circuit is a circuit configured to correct the color balance of image data. The gradation conversion circuit is a circuit configured to correct the gradation characteristic of image data. The image processing unit 110 performs various image processes, such as white balance correction and noise reduction, on the image data stored in the frame memory 109. The image data, so processed, is supplied from the processing unit 110 to the frame memory 109 though the bus 108. The image data is thereby stored in the frame memory 109.

The compression-expansion processing unit 111 reads the image data processed in the processing unit 110, from the frame memory 109 through the bus 108, and compresses the image data by using, for example, the JPEG system, in preparation for the recording of the image data. Further, in order to reproduce the image data, the compression-expansion processing unit 111 reads the compressed image data recorded in the recording medium 113 and already compressed, from the frame memory 109 through the bus 108, and then expands the image data.

The memory interface 112 controls the writing and reading of data to and from the recording medium 113. The recording medium 113 is, for example, a memory card that can be inserted into, and removed from, the imaging apparatus. The image data compressed in the compression-expansion processing unit 111, and other data are recorded in the recording medium 113.

The display control unit 114 reads image data from the frame memory 109 and converts the same to a video signal. The display control unit 114 then outputs the video signal to the display unit 115 and causes the display unit 115 to display an image. The display unit 115 is, for example, a TFT liquid crystal display and displays the image represented by the video signal supplied from the display control unit 114.

The microcomputer 116 controls all operation sequences that are performed in the imaging apparatus. The operation unit 117 and flash memory 118 are connected to the microcomputer 116. The microcomputer 116 operates in accordance with clock signal CLK3 generated by the oscillator 119.

The operation unit 117 is an operation unit the user may operate to make the imaging apparatus of FIG. 1 to work as he or she desires. When the user operates any member provided on the operation unit 117, the microcomputer 116 executes the operation sequence desired. Further, the operation unit 117 can set the imaging apparatus to any desired operating mode. The flash memory 118 stores various parameters that the imaging apparatus needs to operate in various ways.

The flash memory 118 also stores various programs the microprocessor 116 may execute. In accordance with the program stored in the flash memory 118, the microprocessor 116 reads, from the flash memory 118, the parameters required in various operation sequences. The microprocessor 116 then uses these parameters to perform various processes.

The oscillator 119 generates a clock signal CLK3 that is a reference clock signal necessary for the generation of clock signal CLK2 in the mask processing unit 106. In the present embodiment, clock signal CLK3 may be used, also as a system clock signal for the microcomputer 116. In this case, clock signal CLK3 generated in the oscillator 119 is input not only to the mask processing unit 106, but also to the microcomputer 116.

Figure 6:
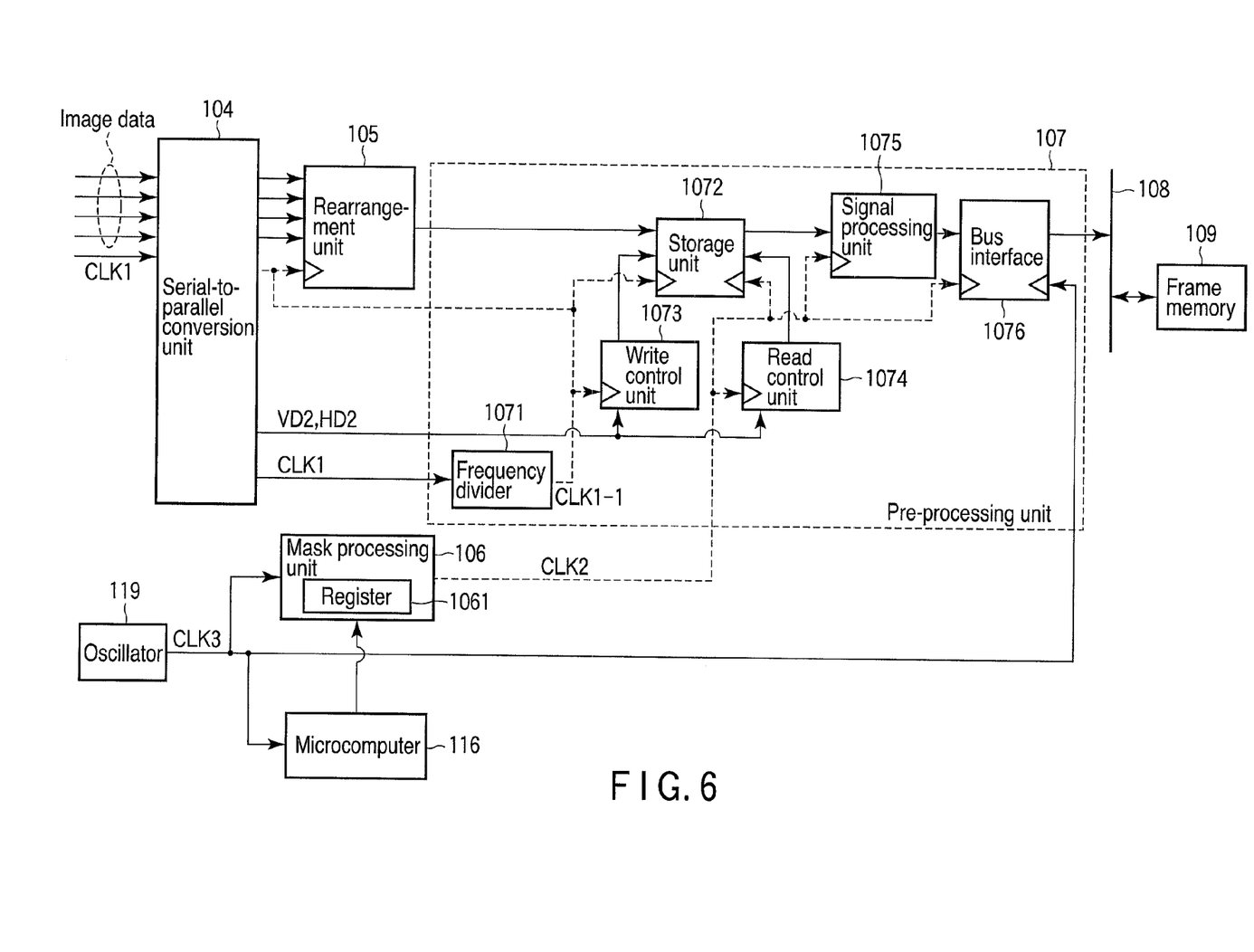
FIG. 6 is a diagram showing, in detail, a mask processing unit and a pre-processing unit, both incorporated in the first embodiment of this invention.

The configuration and operation of the pre-processing unit 107 according to the first embodiment will now be described in detail. FIG. 6 is a diagram showing, in detail, the mask processing unit 106 and the pre-processing unit 107, both incorporated in the first embodiment. Note that FIG. 6 illustrates the configuration that the pre-processing unit 107 has if the four-channel image data input from the serial-to-parallel conversion unit 104 is rearranged to one-channel image data in the rearrangement unit 105.

As shown in FIG. 6, the mask processing unit 106, which functions as a clock generation unit, has a register 1061. The register 1061 holds a prescribed mask pattern that has been set by the microcomputer 116. The number of bits that the register 1061 has may be of an arbitrary value. Nonetheless, a case where the register 1061 has eight bits will be explained below.

Figure 7A:
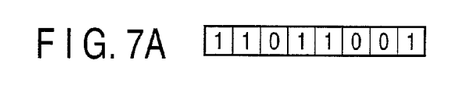
FIGS. 7A and 7B are diagrams showing an exemplary mask pattern.
Figure 7B:
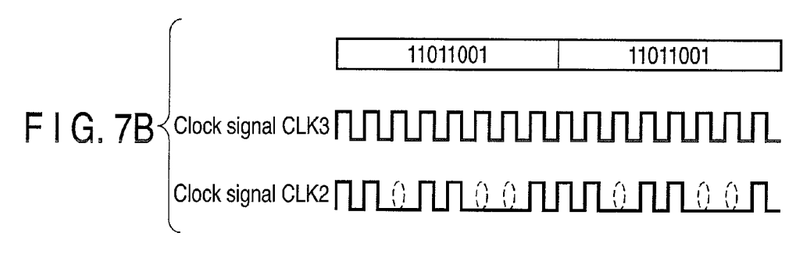

The mask processing unit 106 masks clock signal CLK3 in accordance with the mask pattern set in the register 1061. The mask processing unit 106 thereby generates a clock signal CLK2 that is not only a reading clock signal for a storage unit 1072, but also a drive clock signal for a signal processing unit 1075 and a bus interface 1076. The microcomputer 116 may set, for example, such an 8-bit mask pattern as shown in FIG. 7A. In this case, the mask processing unit 106 outputs a clock signal CLK3 corresponding to any binary-1 part, without masking the same, and masks a clock signal CLK3 corresponding to any binary-0 part. As a result, the mask processing unit 106 outputs a clock signal CLK2 in which a part of clock signal CLK3 is missing shown in FIG. 7B.

In this way, a clock signal CLK2 of any given frequency can be generated in the present embodiment without using PLLs, because an appropriate mask pattern has been set in the register 1061. The higher the speed of clock signal CLK3, the more minutely the frequency of clock signal CLK2 can be controlled.

In this embodiment, clock signal CLK2 is used, making it possible to process the image signals at a speed associated with the operating mode of the imaging apparatus. To this end, the mask pattern is so set that clock signal CLK2 may have the frequency that accords with the amount of one-channel image data output from the rearrangement unit 105. How the mask pattern is so set will be explained later in detail.

The pre-processing unit 107 has a frequency divider 1071, a storage unit 1072, a write control unit 1073, a read control unit 1074, a signal processing unit 1075, and a bus interface 1076.

The frequency divider 1071 divides the frequency of clock signal CLK1 input from the serial-to-parallel conversion unit 104, and generates a clock signal CLK1-1. Clock signal CLK1-1 is used as a write clock signal in the storage unit 1072, and also as a drive clock signal in the write control unit 1073. Note that clock signal CLK1-1 output from the frequency divider 1071 may be identical to output clock signal CLK1. That is, the frequency divider 1071 may divide the frequency of clock signal CLK1 by frequency divisor of one.

The storage unit 1072 is constituted by, for example, a static RAM (SRAM), and stores the image data rearranged in the rearrangement unit 105. The image data is written to the storage unit 1072 when the write signal coming from the write control unit 1073 is enabled, and is read from the storage unit 1072 when the read signal coming from the read control unit 1074 is enabled.

The first embodiment is based on the assumption that the storage unit 1072 is a dual-port SRAM, i.e., an SRAM that has two input/output ports for image data. In this case, the write clock signal CLK1-1 and the read clock signal CLK2 are input to the two ports of the storage unit 1072, respectively. As a result, the image data synchronous with the write clock signal CLK1-1 and the image data synchronous with the read clock signal CLK2 can be respectively written and read concurrently.

The write control unit 1073 that functions as a write control unit enables or disables the write signal supplied to the storage unit 1072 in synchronism with the write clock signal CLK1-1 if a sync signal VD2 or a sync signal HD2 is input to it from the serial-to-parallel conversion unit 104. The write control unit 1073 therefore controls the writing of image data from the rearrangement unit 105 to the storage unit 1072. The write control unit 1073 identifies the valid position for the image data output from the rearrangement unit 105, in accordance with the operating mode of the imaging apparatus. The write control unit 1073 then enables or disables the write signal so that the image data associated with the valid position thus identified may be written, pixel by pixel to the storage unit 1072. Alternatively, the rearrangement unit 105 may identify the valid position for the image data and may then enable or disable the write signal.

The read control unit 1074 that functions as a read control unit enables or disables the read signal supplied to the storage unit 1072 in synchronism with the read clock signal CLK2 if sync signal VD2 or sync signal HD2 is input to it. Thus, the read control unit 1074 controls the reading of image data associated with the valid position, pixel by pixel, from the storage unit 1072.

In synchronism with clock signal CLK2, the signal processing unit 1075 performs pre-processing, such as shading correction or noised reduction, on the image data corresponding to the valid part of data read from the storage unit 1072. The bus interface 1076 has a buffer memory that can store the image data input from the signal processing unit 1075. Every time image data is stored in the buffer memory, the bus interface 1076 sends a request for the transfer of image data to the bus 108, in synchronism with clock signals CLK2 and CLK3. If the bus 108 grants the request, the bus interface 1076 will input the image data to the bus 108.

Figure 8:
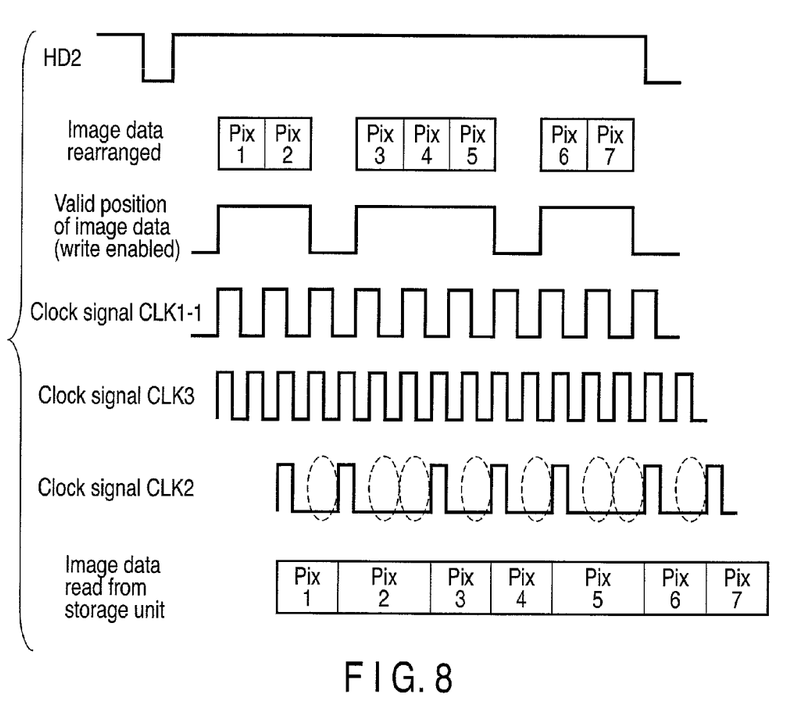
FIG. 8 is a timing chart explaining how the mask processing unit and the pre-processing unit operate in the first embodiment of this invention.

How the mask processing unit 106 and the pre-processing unit 107, both shown in FIG. 6, operate will be explained with reference to the timing chart of FIG. 8.

First, the serial-to-parallel conversion unit 104 restores vertical sync signal VD2 or horizontal sync signal HD2 from a code representing the sync signal contained in LVDS data. Vertical sync signal VD2 or horizontal sync signal HD2, thus restored, is input to the write control unit 1073 and the read control unit 1074. As a result, the write control unit 1073 and the read control unit 1074 determine the processing of one frame or one line of image data has been started.

On receiving vertical sync signal VD2 or horizontal sync signal HD2, the write control unit 1073 identifies the valid position of the image data rearranged, in accordance with the amount of one-channel image data output from the rearrangement unit 105. The amount of one-channel image data is determined by the mode in which the imaging apparatus is presently operating. The write control unit 1073 counts clock signals CLK1-1 and enables the write signal at the time when the image data corresponding to the valid position is output from the rearrangement unit 105. As a result, image data Pix1 to Pix7 corresponding to the valid position is written to the storage unit 1072, pixel by pixel, as shown in FIG. 6.

In accordance with the amount of one-channel image data, which is determined by the mode in which the imaging apparatus is presently operating, the microcomputer 116 sets a mask pattern in the register 1061 of the mask processing unit 106.

The image data may be rearranged as shown in FIG. 5A. In this case, the image data corresponding to the valid position four times during four cycles of clock signal CLK1 will be output as described above. In this case, the amount of one-channel image data output from the rearrangement unit 105 is 4 pixels/4 clocks. Hence, if the image data is read at a time later than the data of this amount, the reading of the image data will not precede the writing of the image data. The image data corresponding to the valid position can therefore be processed. In order to read the image data in this way, clock signal CLK2 only needs to have a frequency equal to or lower than the frequency at which image data can be read four times during four cycles of clock signal CLK1. For example, if clock signal CLK1 has frequency of 100 MHz and clock signal CLK3 has frequency of 150 MHz, the frequency of clock signal CLK2/the frequency of clock signal CLK3 is (4/4×100)/150=0.66. The ratio of clock signal CLK2 to clock signal CLK3 in terms of actual frequency may therefore be set to 0.66 or less. Assume that an 8-bit mask pattern can be set in the register 1061. Then, if eight clock signals CLK3 are input, it suffices to output only 5.28 (=8×0.66) clock signals CLK2 or less clock signals. In view of this, the mask pattern is, for example, 00110111 (five out of eight bits being valid), neglecting the decimal fraction. The positions of binary is assume in the mask pattern are not important, whereas the number of binary is important. Therefore, the mask pattern may be 00011111 instead. In synchronism with clock signal CLK2 generated in accordance with such a mask pattern, the image data is read from the storage unit 1072. Then, the image data corresponding to the valid position stored in the rearrangement unit 105 can be correctly read, pixel by pixel.

In order to rearrange the image data as shown in FIG. 5B, the image data is output, which corresponds to the valid position only twice during eight cycles of clock signal CLK1. In this case, the amount of one-channel image data output from the rearrangement unit 105 is 4 pixels/4 clocks. Then, if eight clock signals CLK3 are input, it suffices to output less than 5.28 (=8×0.66) clock signals CLK2. In view of this, the mask pattern is, for example, 00110111. The image data corresponding to the valid position stored in the rearrangement unit 105 can therefore be correctly read.

In the instances of FIG. 5C and also in the instance of FIG. 5D, the mask pattern can be set in the same manner as explained above. In the instance of FIG. 5C, the frequency of clock signal CLK2/the frequency of clock signal CLK3 is (2/4×100)/150=0.33. If eight clock signals CLK3 are input, it suffices to output less than 2.64 (=8×0.33) clock signals CLK2. The mask pattern is therefore, for example, 00010001. In the instance of FIG. 5D, the frequency of clock signal CLK2/the frequency of clock signal CLK3 is (2/2×50)/150=0.33. If eight clock signals CLK3 are input, it suffices to output less than 2.64 (=8×0.33) clock signals CLK2. The mask pattern is therefore, for example, 00010001.

The read control unit 1074 enables the read signal at the time when clock signal CLK2 is input to it. The image data corresponding to the valid position is therefore read as shown in FIG. 6, pixel by pixel from the storage unit 1072 in synchronism with clock signal CLK2.

The signal processing unit 1075 receives the image data read from the storage unit 1072 in synchronism with clock signal CLK2, and sequentially processes this image data in synchronism with clock signal CLK2. The signal processing unit 1075 can thus process signals at a speed associated with the operating mode of the imaging apparatus.

As has been described, the mask processing unit 106 masks clock signal CLK3 coming from the oscillator 119 in this embodiment, thereby generating a clock signal CLK2 of any given frequency, without using PLLs. Moreover, a mask pattern for generating clock signal CLK2 is set on the basis of the amount of one-channel image data output from the rearrangement unit 105, which changes in accordance with the operating mode of the imaging apparatus. This enables the signal processing unit 1075 to correctly process the image data transferred at high speed in synchronism with clock signal CLK1, in synchronism with clock signal CLK2 having a frequency that accords with the operating mode of the imaging apparatus.

Furthermore, clock signal CLK2 can be generated immediately as the operating mode is changed, because the present embodiment need not have a PLL to generate clock signal CLK2. That is, clock signal CLK2 can be generated even if the operating mode is abruptly changed to another.

Still further, the storage unit 1072 is, for example, a dual-port SRAM. Hence, the image data can be written, pixel by pixel, from the rearrangement unit 105 to the storage unit 1072 in synchronism with a clock signal at the same time the image data is read, pixel by pixel, from the storage unit 1072 to the signal processing unit 1075 in synchronism with a different clock signal.

In the instance described above, the reference clock signal CLK3 used to generate clock signal CLK2 is used also as the system clock of the microcomputer 116. Instead, clock signal CLK1 may be used as clock signal CLK3.

In the configuration show in FIG. 6, the image data is written to the storage unit 1072 and read from the storage unit 1072, in the same order. Nevertheless, the image data may be written to the storage unit 1072 in one order, and may be read from the storage unit 1072 in a different order. If the image data is read in an order different from the order in which it was written, image signals of the same color, produced by the imaging element 1031, will be more readily mixed in a pixel mixing process.

FIG. 6 shows a configuration in which the rearrangement unit 105 rearranges the four-channel image data input from the serial-to-parallel conversion unit 104, changing the same to one-channel image data. In order to rearrange the image data, ultimately to produce two-channel image data, it suffices to use two storage units 1072. Similarly, to arrange the image data, thereby to produce three-channel image data, it suffices to use more storage units 1072 in accordance with the number of channels of image data to produce. In these alternative cases, clock signal CLK2 is generated in the same way as in the case where the image data is rearranged to produce one-channel image data.

In the present embodiment, the serial image data is rearranged to parallel image data in the rearrangement unit 105. Nevertheless, the rearrangement unit 105 may be dispensed with.

[Second Embodiment]

A second embodiment of this invention will now be described. In the first embodiment described above, a dual-port SRAM is used as storage unit 1072, and the write clock signal CLK1-1 and read clock signal CLK2 are input concurrently, thereby concurrently writing and reading image data pixel by pixel. In contrast, the second embodiment uses a single-port SRAM, i.e., a RAM having only one input/output port for image data, and yet can achieve advantages similar to those of the first embodiment.

Figure 9:
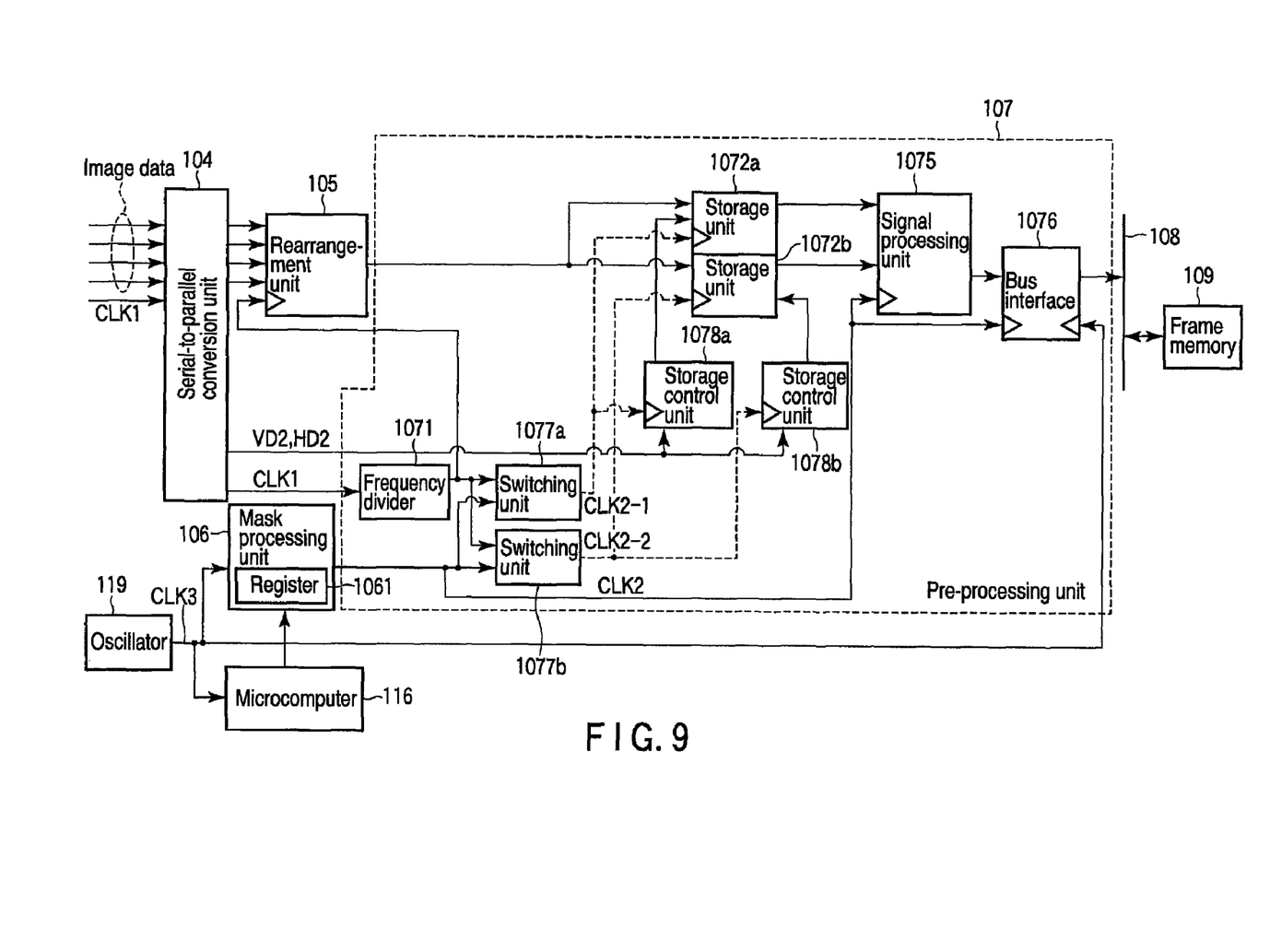
FIG. 9 is a diagram showing, in detail, a mask processing unit and a pre-processing unit, both incorporated in a second embodiment of this invention.

FIG. 9 is a diagram showing, in detail, the configurations of the mask processing unit 106 and pre-processing unit 107, both incorporated in the second embodiment. Like FIG. 6, FIG. 9 shows a configuration in which the rearrangement unit 105 rearranges four-channel image data input from the serial-to-parallel conversion unit 104, changing the same to one-channel image data.

In FIG. 9, the components identical to those shown in FIG. 6 are designated by the same reference numbers. Such components will not be described. As shown in FIG. 9, two storage units 1072*a* and 1072*b* are independently controlled by storage control units 1078*a* and 1078*b*, respectively. The second embodiment differs in this respect from the first embodiment shown in FIG. 6. The second embodiment further differs in that the clock signals input to the storage units and storage control units are switched by switching units 1077a and 1077b.

Storage units 1072a and 1072b are assumed to be single-port SRAMs. Storage control unit 1078a controls both the writing of image data to storage unit 1072a and the reading of image data from storage unit 1072a. Storage control unit 1078b controls both the writing of image data to storage unit 1072b and the reading of image data from storage unit 1072b.

Switching units 1077a and 1077b input clock signal CLK1-1 to one of storage units 1072a and 1072b and one of storage control units 1078a and 1078b, to which the image data should be written. Further, switching units 1077a and 1077b input a clock signal CLK2-1 or CLK2-2 to one of storage units 1072a and 1072b and one of storage control units 1078a and 1078b, from which the image data should be read. The switching between clock signals CLK2-1 and CLK2-2 is performed for each line of image data.

Clock signal CLK2-1 or CLK2-2 is identical to clock signal CLK2. They are generated to have the frequency that accords with the operating mode of the imaging apparatus, as in the first embodiment.

Figure 10:
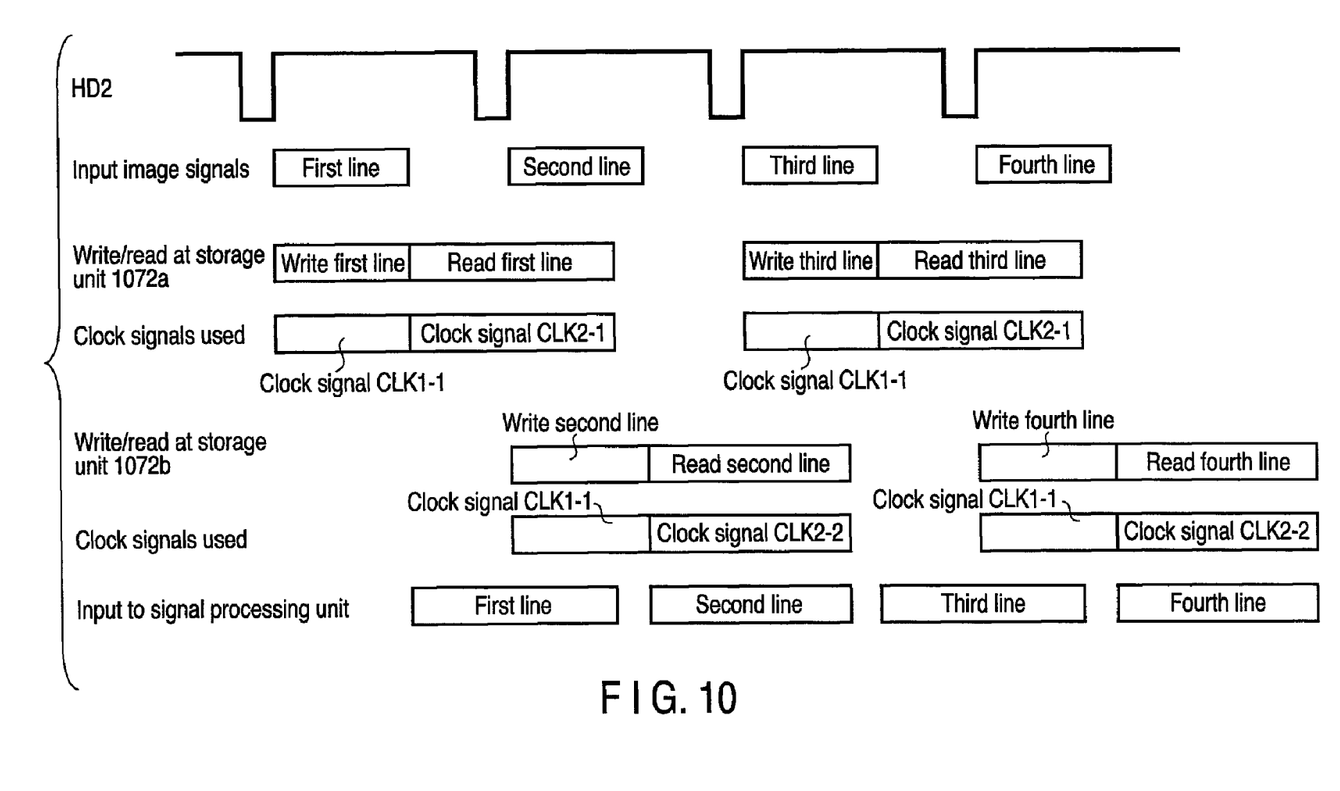
FIG. 10 is a timing chart explaining how the pre-processing unit operates in the second embodiment of this invention.

How storage units 1072a and 1072b operate in the second embodiment will be explained with reference to the timing chart of FIG. 10. In the first embodiment, every time horizontal sync signal HD2 is input, the image data rearranged in the rearrangement unit 105 is output, pixel by pixel, in synchronism with clock signal CLK1-1 (including clock signal CLK1) as has been described. In the second embodiment, the image data is written to and read from storage units 1072a and 1072b, in units of lines. This is because storage units 1072a and 1072b are single-port SRAMs, making it difficult to alternately write and read the image data in units of pixels.

Therefore, switching unit 1077a first inputs clock signal CLK1-1 to storage unit 1072a and storage control unit 1078a in order to write the image data to storage unit 1072a. On receiving clock signal CLK1-1, storage control unit 1078a enables the write signal in synchronism with clock signal CLK1-*l*. The first line of image data is thereby sequentially written to storage unit 1072a.

After one line of image data has been written to storage unit 1072a, switching unit 1077a inputs clock signal CLK2-1 to storage unit 1072a and storage control unit 1078a. On receiving clock signal CLK2-1, storage control unit 1078a enables the read signal in synchronism with clock signal CLK2-1. The first line of image data is thereby read from storage unit 1072a. Thereafter, pre-processing is performed on the first line of image data in the signal processing unit 1075.

While the image data is being read from storage unit 1072a, the second line of image data is output from the rearrangement unit 105. Since the second line of image data cannot be written to storage unit 1072a, switching unit 1077b inputs clock signal CLK1-1 to storage unit 1072b and storage control unit 1078b in order to write the image data to storage unit 1072b. On receiving clock signal CLK1-1, storage control unit 1078b enables the write signal in synchronism with clock signal CLK1-1. The second line of image data is thereby written to storage unit 1072b.

After one line of image data has been written to storage unit 1072b, switching unit 1077b inputs clock signal CLK2-2 to storage unit 1072b and storage control unit 1078b. On receiving clock signal CLK2-2, storage control unit 1078b enables the read signal in synchronism with clock signal CLK2-2. The second line of image data is thereby read from storage unit 1072b. Thereafter, pre-processing is performed on the second line of image data in the signal processing unit 1075.

Thereafter, every time an odd-numbered line of image data is output from the rearrangement unit 105, storage unit 1072a is used to write and read the odd-numbered line of image data. Every time an even-numbered line of image data is output from the rearrangement unit 105, storage unit 1072b is used to write and read the even-numbered line of image data. Thus, the second embodiment that uses single-port SRAMS can achieve advantages similar to those of the first embodiment.

As the first embodiment does, the second embodiment configured as described above generates clock signals CLK2, CLK2-1 and CLK2-2 without using PLLs, and can process signals in accordance with the operating mode of the imaging apparatus. Moreover, the circuit section can be smaller than in the first embodiment, because two single-port SRAMs, not one dual-port SRAM as in the first embodiment, are used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging element configured to output image signals;
a transfer unit configured to serially transfer the image signals, by using a plurality of transfer channels;
a storage unit configured to store the image signals serially transferred from the plurality of transfer channels;
a signal processing unit configured to process the image signals stored in the storage unit;
a write control unit configured to control writing of the image signals from the transfer unit to the storage unit, in synchronism with a first clock signal synchronous with the image signals serially transferred by the transfer unit;
a read control unit configured to control reading of the image signals from the storage unit to the signal processing unit, in synchronism with a second clock signal for driving the signal processing unit; and
a clock generation unit configured to generate the second clock signal having a frequency that accords with an amount of data constituted by the image signals transferred from the transfer unit to the storage unit, wherein
the clock generation unit generates the second clock signal by performing a masking process on a third clock signal, using a prescribed pattern associated with the amount of data constituted by the image signals, and
the second clock signal and the third clock signal are synchronous with each other.

2. The imaging apparatus according to claim 1, wherein the storage unit is a dual-port RAM having two input/output ports, the write control unit uses one of the input/output ports of the storage unit, thereby controlling the writing of the image signals, and the read control unit uses the other input/output port of the storage unit, thereby controlling the reading of the image signals.

3. The imaging apparatus according to claim 1, wherein the storage unit is constituted by a plurality of single-port RAMs, each having one input/output port, and a switching unit is further incorporated and selects the first clock signal, causing the write control unit to write the image signals to each of the single-port RAMs to which the image signals should be written, and selects the second clock signal, causing the read control unit to read the image signals from each of the single-port RAMs from which the image signals should be read.

4. The imaging apparatus according to claim 3, wherein the image signals are sequentially written and read, in units of lines, to and from the plurality of single-port RAMs.

5. The imaging apparatus according to claim 1, wherein the first clock signal is used as the third clock signal.

6. The imaging apparatus according to claim 1, wherein the prescribed pattern is changed in accordance with an operating mode of the imaging apparatus.

7. The imaging apparatus according to claim 6, wherein the operating mode includes any one of a single-shot mode, in which the imaging element produces a still picture, a movie mode, in which the imaging element produces a moving picture, a live-view mode, in which the imaging element produces a moving picture for immediate display, and an AF mode, in which focus control is performed in accordance with the image signals produced by the imaging element.

8. The imaging apparatus according to claim 7, wherein a frequency of the second clock signal generated by using the prescribed pattern in single-shot mode is higher than a frequency of the second clock signal generated by using the prescribed pattern in movie mode, live-view mode or AF mode.

9. The imaging apparatus according to claim 8, wherein the number of transfer channels that the transfer unit uses to transfer the image signals serially is changed in accordance with the operating mode.

10. The imaging apparatus according to claim 7, wherein the number of transfer channels that the transfer unit uses to transfer the image signals serially is changed in accordance with the operating mode.

11. The imaging apparatus according to claim 6, wherein the number of transfer channels that the transfer unit uses to transfer the image signals serially is changed in accordance with the operating mode.

12. The imaging apparatus according to claim 1, wherein the transfer unit performs the serial transfer by means of an LVDS system.

13. The imaging apparatus according to claim 1 wherein the prescribed pattern of the masking process has a number of bits set to "1" based on (1) an amount of one-channel image data output from the transfer unit to the storage unit, (2) a frequency of the second clock signal, and (3) a frequency of the third clock signal.

14. The imaging apparatus according to claim 13 wherein the positions of the bits set to "1" in the prescribed pattern of the masking process are arbitrary.

* * * * *